United States Patent
Schmieder et al.

(10) Patent No.: US 7,296,947 B2
(45) Date of Patent: Nov. 20, 2007

(54) ARRANGEMENT HAVING A FIRST COMPONENT, A SECOND COMPONENT AND A CONNECTING ELEMENT

(75) Inventors: Hansjörg Schmieder, Oberkirch-Zusenhofen (DE); Hans Merkle, Endingen (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 429 days.

(21) Appl. No.: 10/940,890

(22) Filed: Sep. 14, 2004

(65) Prior Publication Data

US 2005/0095059 A1 May 5, 2005

Related U.S. Application Data

(63) Continuation of application No. PCT/EP03/03267, filed on Mar. 28, 2003.

(30) Foreign Application Priority Data

Mar. 28, 2002 (EP) ................... 02007136
Apr. 30, 2002 (DE) ................. 102 20 329

(51) Int. Cl.
 *B25G 3/20* (2006.01)
 *F16B 2/00* (2006.01)
 *F16B 7/04* (2006.01)
(52) U.S. Cl. .................. 403/370; 403/109.5; 403/368; 403/409.1; 411/432; 411/433
(58) Field of Classification Search ............ 403/109.5, 403/409.1, 370, 366–368; 411/546, 535, 411/432, 433, 183
See application file for complete search history.

(56) References Cited

U.S. PATENT DOCUMENTS 3,701,302 A * 10/1972 Pestka et al. .................. 411/15

(Continued)

FOREIGN PATENT DOCUMENTS

DE       197 41 551 A1      4/1999

*Primary Examiner*—Daniel P. Stodola
*Assistant Examiner*—Nahid Amiri
(74) *Attorney, Agent, or Firm*—Harness, Dickey & Pierce, P.L.C.

(57) ABSTRACT

An arrangement has a first component, a second component, and a connecting element for connecting the first component to the second component at a distance from one another, the first component, at least at an end that is to be connected to the second component, being in profiled section, in particular tubular, form. The connecting element has an axially moveable spacer piece for bridging the distance between that end of the first component which is to be connected and the second component, and also has at least one clamping piece, that can be brought into contact in a clamping manner with a wall of the first component, and furthermore an actuating mechanism that is operatively connected to the spacer piece and the clamping piece in such a manner that when the actuating mechanism is actuated, the spacer piece moves in the axial direction until it comes into contact with the second component and the clamping piece is brought into clamping engagement with the wall of the first component. At that end of the first component which is to be connected to the second component there is at least one step, which is directed toward the longitudinal center axis of the first component and in front of which the at least one clamping piece comes into engagement with the wall of the first component.

20 Claims, 3 Drawing Sheets

U.S. PATENT DOCUMENTS

| | | |
|---|---|---|
| 4,013,372 A | 3/1977 | Lay et al. |
| 4,190,375 A * | 2/1980 | Berry .......................... 403/7 |
| 4,682,906 A * | 7/1987 | Ruckert et al. .......... 403/409.1 |
| 5,288,191 A * | 2/1994 | Ruckert et al. ............. 411/432 |
| 5,340,258 A * | 8/1994 | Simon ........................ 411/535 |
| 6,560,819 B2 * | 5/2003 | Mizuno et al. ................ 16/2.2 |

\* cited by examiner

Fig.3

ARRANGEMENT HAVING A FIRST COMPONENT, A SECOND COMPONENT AND A CONNECTING ELEMENT

CROSS REFERENCE TO RELATED APPLICATIONS

The present application is a Continuation of pending International patent application PCT/EP03/03267 filed on Mar. 28, 2003 which designates the United States and which claims priority of European patent application 02 007 136.1 filed on Mar. 28, 2002 and of German patent application 102 20 329.6 filed on Apr. 30, 2002.

BACKGROUND OF THE INVENTION

The invention relates to an arrangement comprising a first component and a second component, and a connecting element for connecting the first component to the second component at a distance from one another.

In the context of the present invention, the terms "first component" and "second component" are to be understood in a general sense. The first component may be a profiled section, in particular a hollow profiled section, which has a lateral surface which is completely continuous in the circumferential direction or alternatively is partially open. In the latter case, the first component may, for example, be a U-section or a C-section or also generally a rectangular profiled section. The second component may, for example, be a profiled section or a plate.

One specific application for the arrangement described in the introduction is that of connecting a tensioning tube to an A-pillar of a motor vehicle. In motor vehicles, a horizontal cross-member to which inter alia the dashboard is secured usually runs between the substantially vertical A-pillars. In addition to the cross-member bearing the dashboard, however, it is also possible for an additional tensioning tube to be braced between the two A-pillars. The additional tensioning tube can be used, for example, to prevent the A-pillars from buckling outward in the event of a crash.

One problem with securing a tensioning tube between the A-pillars of a motor vehicle is that the distance between the A-pillars may vary from vehicle to vehicle, even in the case of the same model of vehicle, on account of manufacturing tolerances. Since providing tensioning tubes which are suitably matched to the distances which occur between the A-pillars would entail considerable increased cost and time expenditure, it is more expedient for the tensioning tubes to be cut to a minimum length which corresponds to the minimum distance between the A-pillars produced by the tolerances. This in turn presents the problem that a tensioning tube of this type, i.e. one which has been cut to a minimal length, has to be secured at a distance from at least one of the A-pillars in the case of a vehicle in which the distance between the A-pillars is greater on account of the tolerances. This requires a connection technique which allows length compensation between that end of the tensioning tube which is to be secured to the A-pillar or the A-pillar(s), i.e. takes account of the possible tolerances.

It is desirable to have an arrangement which allows a tensioning tube to be connected to an A-pillar at a distance and which, moreover, is able to transmit the high forces which occur in the event of a crash, which may amount to more than 80 kN, from the A-pillar to the tensioning tube without the connection between tensioning tube and A-pillar becoming detached so that the A-pillar buckles laterally outward.

DE 197 41 551 A1 has described a connection arrangement for connecting a cross-member to the A-pillars of a motor vehicle, the intention of which is to achieve an axial tolerance compensation combined, at the same time, with a high tensile and compressive strength in the connection. The known connecting element has an axially displaceable spacer piece and a radially spreadable clamping piece, as well as an actuating mechanism for spreading the clamping piece. The clamping piece is brought into clamping engagement with the wall of the first component via the actuating mechanism.

Nevertheless, with this known arrangement, it is impossible to rule out the possibility that in the event of particularly high tensile forces acting on the connection the frictional lock between the clamping piece and the wall of the first component will be overcome and the clamping piece will slip off the first component, so that the first component is separated from the second component.

SUMMARY OF THE INVENTION

The invention is based on the object of refining an arrangement of the type described in the introduction in such a way as to increase the strength of the connection between the first component and the second component.

According to an aspect of the invention, an arrangement is provided, comprising:
  a first component, having a longitudinal center axis, a wall and having an end, said first component being in profiled section form at least at said end,
  a second component,
  a connecting element for connecting said end of said first component to said second component at a distance from one another,
  said connecting element having an axially movable spacer for bridging said distance between said end of said first component and said second component, further having at least one clamping piece, which can be brought into contact in a clamping manner with said wall of said first component, and furthermore having an actuating mechanism which is operatively connected to said spacer piece and said clamping piece in such a manner that when said actuating mechanism is actuated, said spacer piece moves in direction of said longitudinal center axis until it comes into contact with said second component and said clamping piece is brought into a clamping engagement with said wall of said first component,
  wherein at said end of said first component there is at least one step which is directed for said longitudinal center axis of said first component and in front of which said at least one clamping piece comes into engagement with said wall of said first component.

The advantage of the configuration of the arrangement according to the invention is that the ability of the connection of the first component to the second component to withstand tensile loads is increased compared to the known arrangement. The at least one clamping piece, which comes into predominantly frictional engagement with the wall of the first component, may slip relative to the first component in the event of excessively high tensile loads. However, the at least one step provided at the first component limits this slipping or prevents it from the outset, depending on the distance from the step at which the clamping piece comes into engagement with the first component when the actuating mechanism is actuated during connection of the first component to the second component. The step which is provided on the first component in accordance with the invention therefore prevents the connection between the first and second components from becoming disconnected, thereby considerably increasing the strength of the connection.

Therefore, the arrangement according to the invention inherently combines the function of length compensation, which is realized by the axially moveable spacer piece, and the realized by the axially moveable spacer piece, and the exertion of a clamping force on the first component, which is applied by the at least one clamping piece, with the step which is provided in accordance with the invention additionally being responsible for a considerable improvement in the operating safety of the arrangement under high forces. Therefore, the arrangement according to the invention is able to connect the first component to the second component so securely that when the arrangement is used to connect a tensioning tube to the A-pillar, the high forces which occur in the event of a crash are transmitted from the connecting element to the first component, i.e. the tensioning tube, without the tensioning tube being torn off the A-pillar at the connecting location.

The step may, for example, be formed by machining of the tube end, for example widening and flanging, as an edge or rim formed integrally with the first component or by rolling in a bead, or by welding, soldering, adhesively bonding or shrinking a bush onto the first component. If the first component or at least the end which is to be connected to the second component is made from a relatively thick material, the at least one step can also be produced by material-removing machining.

In one preferred configuration, at the first component there is a further step which is directed toward the longitudinal center axis of the first component and which is at an axial distance from the first step.

This second step, together with the first step on the first component forms a pocket which is recessed transversely with respect to the longitudinal direction and in which the at least one clamping piece comes into engagement with the wall of the first component.

Furthermore, it is preferable if that end of the first component which is to be connected to the second component is tubular in form, and if the at least one step extends over the entire circumference of the wall of the first component.

Forming the at least one step over the entire circumference in this way further improves the tensile strength of the arrangement. The at least one or two steps may be formed as radially inwardly directed projections on the first component.

In a further preferred configuration, that end of the first component which is to be connected to the second component is formed as an attachment piece which is fixedly connected to the remaining part of the first component and on which the at least one step is present.

The advantage of forming the at least one step on an attachment piece which is fixedly connected to the first component is that the attachment piece, with respect to the remaining body of the first component, can be formed from a material which is harder and/or has thicker walls than the remaining part of the tube, with the result that the tensile strength of the connection can be improved still further while at the same time saving on weight and costs. In the case of the preferred use of the connecting element according to the invention for connecting a tensioning tube to an A-pillar, the attachment piece may be welded as a sleeve onto the end of the tensioning tube, so as to engage over the outside of it.

In a further preferred configuration, the spacer piece and the clamping piece are formed as separate elements.

In this case, it is advantageous that the spacer piece and the clamping piece can move independently of one another, with the result that, by way of example, the clamping piece can be brought into engagement with the first component at a predetermined position irrespective of the position of the spacer piece, which may vary on account of the distance which is to be bridged varying for manufacturing tolerance reasons.

In a further preferred configuration, the connecting element is designed in such a way that the clamping piece can be brought into engagement with the wall of the second component by means of the actuating mechanism as a result of the superimposing of an axial movement and a movement directed transversely with respect to the longitudinal direction of the first component or only as a result of a movement directed transversely with respect to the longitudinal direction of the first component.

In the case of the first alternative, it is advantageous that the clamping piece, as a result of the superimposition of an axial movement and a movement directed transversely with respect to the longitudinal direction of the first component can "dig" or "cut" into the material of the wall of the first component, resulting in not just a frictionally locking but also a positively locking engagement between the clamping piece and the wall of the first component. This allows the connection of the first component to the second component to withstand particularly high forces. An advantage of the second alternative is that the location at which the clamping piece comes into engagement with the first component is well defined in the axial direction.

In a further preferred configuration, the actuating mechanism has a screw mechanism which is designed in such a way that its continuing actuation firstly brings the spacer piece into contact with the second component and then brings the clamping piece into engagement with the wall of the first component.

The advantage in this case is that the screw mechanism creates an actuating mechanism which is particularly simple to operate and which acts on both the spacer piece and the clamping piece, specifically in such a way that first of all the spacer piece is brought into contact with the second component, in order to bridge the distance between it and the first component, and then the clamping piece is brought into engagement with the wall of the first component as a result of further actuation of the screw mechanism, for example the turning of a screw.

In this context, it is preferable if the screw mechanism has a screw, with which a nut is in threaded engagement, which nut moves toward the second component when the screw is turned, in the process moving the spacer piece in the axial direction either directly or indirectly.

This creates an actuating mechanism which is in design terms of advantageously simple construction for the spacer piece, in order to move the spacer piece in the axial direction. The screw in this case preferably acts as a slide, directly or indirectly, on the spacer piece, which is preferably mounted in such a manner that it can slide in the axial direction on the screw.

In a further preferred configuration, the nut, when the screw is turning, acts directly or indirectly on the clamping piece in order to bring it into engagement with the wall of the first component.

In particular in combination with the configuration described above, these measures create a mechanism which is of particularly simple design, since all that is required to move both the spacer piece and the clamping piece is a single nut.

According to the invention, the arrangement according to one or more of the above configurations is used to connect a tube, in particular a tensioning tube, to an A-pillar of a motor vehicle.

However, the arrangement can also be used to connect the cross-member which bears the dashboard to the A-pillar(s).

Further features and advantages will emerge from the following description and the appended drawing.

It will be understood that the features mentioned above and those which are yet to be explained below can be used not only in the combination given in each instance, but also in other combinations or on a stand-alone basis without departing from the scope of the present invention.

BRIEF DESCRIPTION OF THE DRAWING

Selected exemplary embodiments of the invention are illustrated in the drawing and are described in more detail below with reference to the drawing. In the drawing.

DETAILED DESCRIPTION OF PREFERRED EMBODIMENTS

Figure 1:
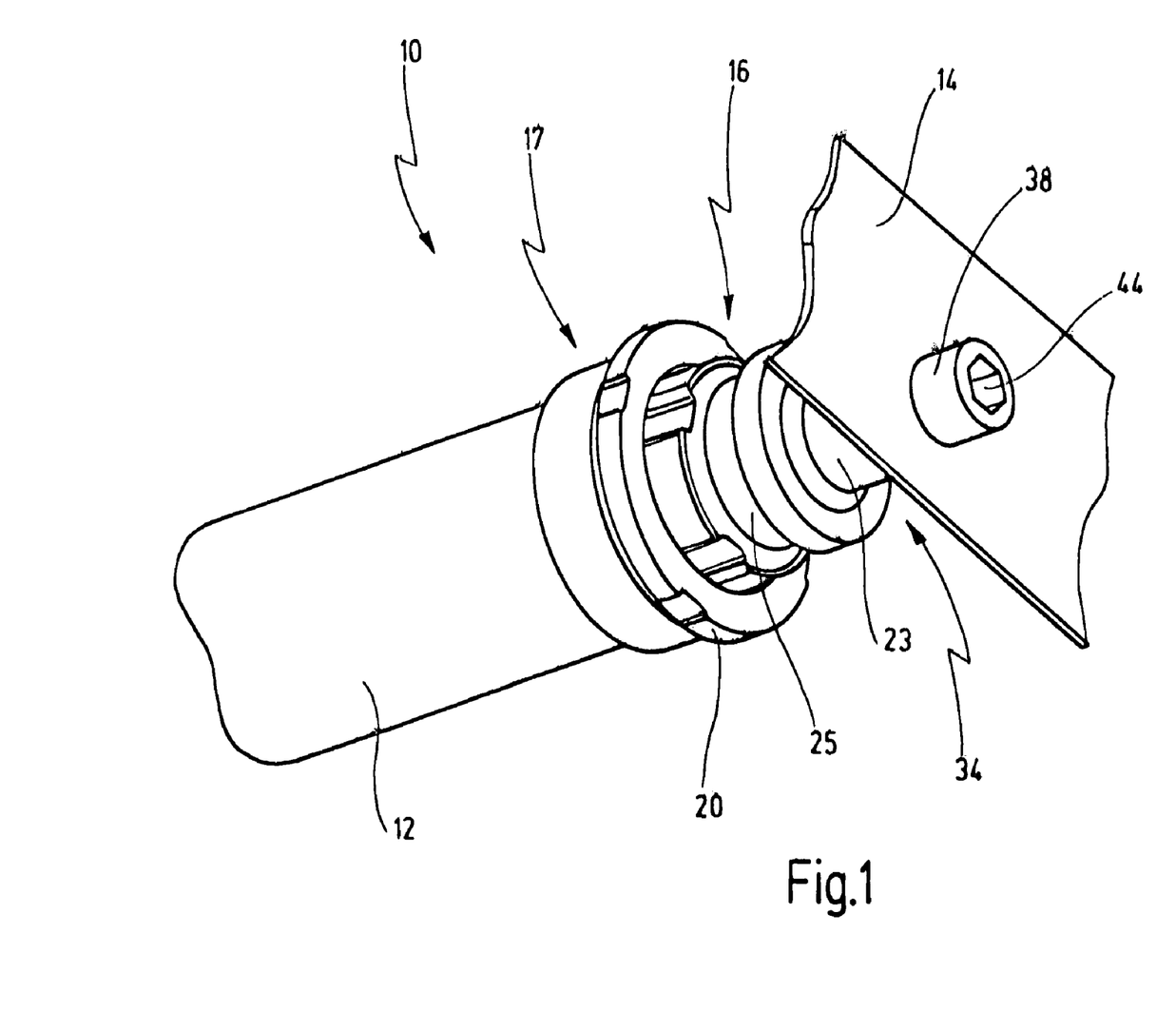
FIG. 1 shows a perspective illustration of an arrangement comprising two components and a connecting element for connecting the two components in accordance with a first exemplary embodiment.
Figure 2:
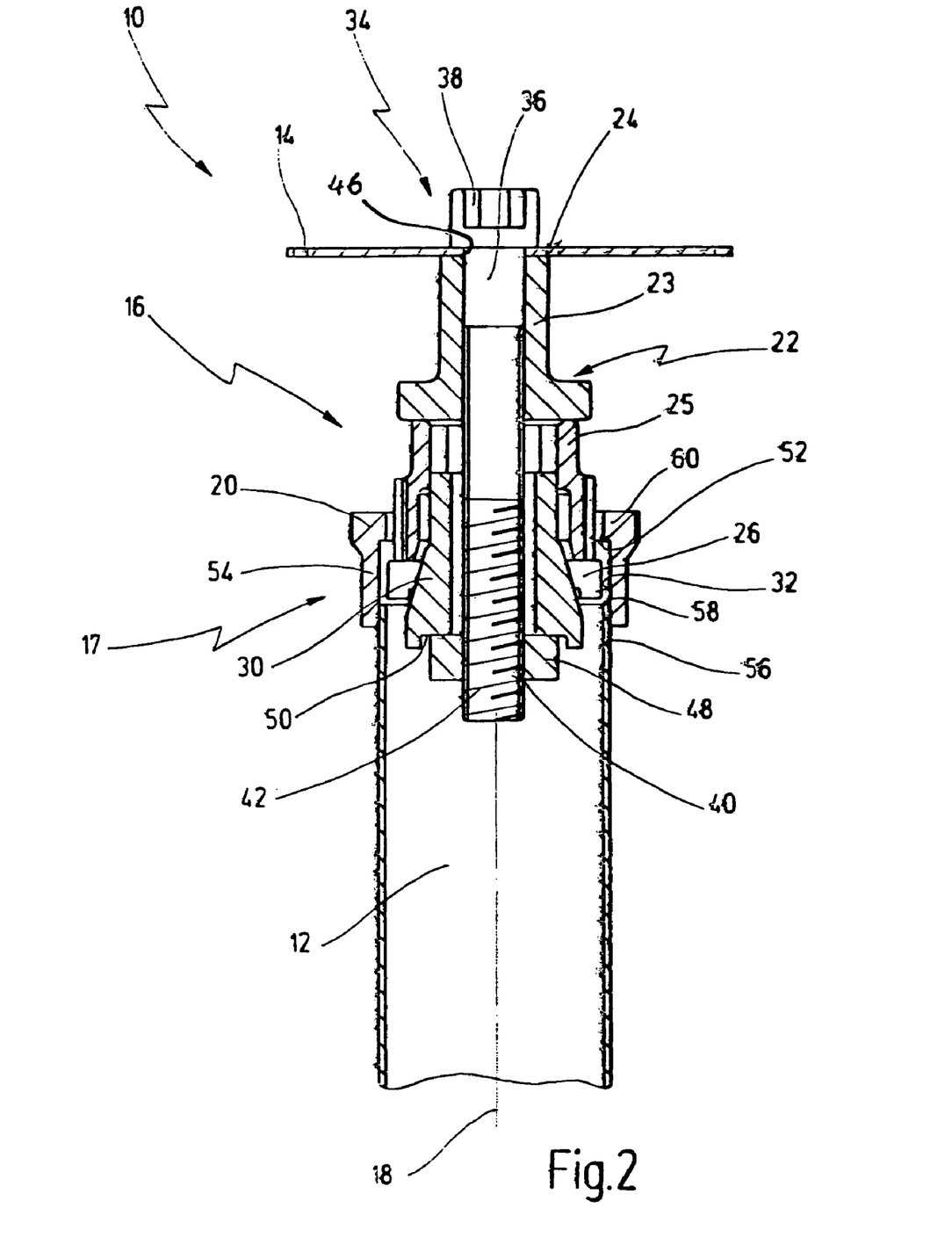
FIG. 2 shows the arrangement shown in FIG. 1 in longitudinal section.

FIGS. 1 and 2 illustrate an arrangement 10 having a first component 12 and a second component 14, as well as a connecting element which is provided with the general reference numeral 16. The connecting element 16 is used to connect the first component 12 to the second component 14. Only parts of the first component 12 and the second component 14 are illustrated in FIGS. 1 and 2.

In the present application, the first component 12 is a tensioning tube, and the second component 14 is an A-pillar of a motor vehicle. An end 17 of the first component 12 which is to be connected to the second component 14 is tubular in form. Furthermore, in the present instance the second component 14 extends substantially transversely with respect to a longitudinal direction or longitudinal center axis 18 of the first component 12. As can be seen from FIGS. 1 and 2, an outermost free end 20 of the first component 12 is at a distance from the second component 14, and the first component 12 is to be connected to the second component 14 at this distance.

The connecting element 16 has a spacer piece 22 which can move axially, i.e. in the longitudinal direction 18, and is designed in the form of a substantially cylinder-symmetrical sleeve 23 and a likewise substantially cylinder-symmetrical sleeve 25 arranged as an axial extension of the sleeve 23. The sleeves 23 and 25 are not fixedly connected to one another. On its side facing the second component 14, the spacer piece 22 has a bearing surface 24, it being possible for the spacer piece 22 to be widened in the manner of a ring on this side. The spacer piece 22 is used to bridge the distance between the outermost free end 20 of the first component 12 and the second component 14. Accordingly, the length of the spacer piece 22 in the longitudinal direction is greater than the distance between the free end 20 of the first component 12 and the second component 14.

An external diameter of the spacer piece 22, in this case of the second sleeve 25, approximately corresponds to the internal diameter, or is slightly smaller than the internal diameter, of the first component 12 in the region of its end 17.

Furthermore, the connecting element 16 has a clamping piece 26 which is designed in the form of a spreadable ring or as a clamping jaw. In a manner which is not illustrated in more detail, the clamping piece 26 has incisions which run in the longitudinal direction 18 and enable it to spread transversely with respect to the longitudinal direction 18, or alternatively, as illustrated, it is possible to provide a plurality of circumferentially distributed clamping jaws which are not connected to one another or are only connected to one another by desired breaking points.

The clamping piece 26 is seated on a conical slide 30, which can move in the axial direction relative to the spacer piece 22 when the connecting element 16 is in the unbraced state. In this configuration, the spacer piece 22 and the clamping piece 26 are separate elements which can move relative to one another.

The clamping piece 26 serves to be brought into clamping contact with an inner-side wall 32 of the first component 12 in order to anchor the connecting element 10 in the first component 12.

As a further module, the connecting element 16 has an actuating mechanism 34. The actuating mechanism 34 is designed as a screw mechanism and comprises a screw 36 which has a screw head 38 and a screw shank 40. The screw shank 40 has an external screw thread 42. As can be seen from FIG. 1, the screw head 38 is provided, for example, with a hexagon socket 44 for attaching a hexagon key. The screw head 38 is seated on the second component 14. The screw 36 is in this case guided through an opening 46 in the second component 14.

A nut 48 which is provided with an internal screw thread, via which the nut 48 is in engagement with the external screw thread 42 of the screw 36, is seated on the screw shank 40. The outside of the nut 48 is designed as a square. The sleeves 23 and 25, which form the spacer piece 22, and the slide 30, by contrast, are arranged in sliding displacement on the shank 40 of the screw. The nut 48 is secured against rotation in a recess 50 of the slide 30. The slide 30 and preferably also the spacer piece 22 are likewise secured against rotation, i.e. cannot rotate with the screw 36 when the latter is turned.

The first component 12 is reinforced in the region of its end 20, so that the connecting element 16 cannot be pulled out of the component 12 as a result of expansion of the wall 32 of the component 12.

At its end 17 which is to be connected to the second component 14, the first component 12 has a step 52 which is directed toward the longitudinal center axis 18 of the first component 12 and in front of which the clamping piece 26 comes into engagement with the wall 32 of the first component 12 when the actuating mechanism 34 is actuated or the screw 36 is turned. When the screw 36 is being tightened, the clamping piece 26 comes into clamping engagement with the wall 32 of the first component 12 in front of the step 52 or adjacent to but at a short distance from the latter. In the event of high tensile loads being exerted on the connection between the first component 12 and the second component 14, the clamping piece 26 may slip on the wall 32 of the first component 12. However, this slipping is limited by the clamping piece 26 coming into positively locking contact with the step 52.

In the exemplary embodiment shown, that end 17 of the first component 12 which is to be connected to the second component 14 is formed by an attachment piece 54, which is connected to the remainder of the first component 12 and on which the step 52 is formed.

The attachment piece 54 is designed in the form of a sleeve, preferably in the form of a union sleeve, which is fixedly connected to the remaining part 56 of the first component 12. For this purpose, the attachment piece 54 partially engages over the outside of the part 56 of the first component 12, with the two parts being, for example, welded together in the region of overlap. In this way, a second step 58 directed toward the longitudinal center axis 18 of the first component 12 is formed. The clamping piece 26 comes into clamping engagement with the wall 32 of the attachment piece 54, which therefore forms part of the first component 12, in the region between the first step 52 and the second step 58.

Accordingly, a pocket is formed in the region between the first step 52 and the second step 58, in which pocket the clamping piece 26 comes into clamping engagement with the wall 32 when the screw 36 is tightened.

The first step 52 is present over the entire circumference of the attachment piece 54, which is tubular in form, and its extent in the radial direction toward the longitudinal center axis 18 approximately corresponds to or is greater than the wall thickness of the part 56 of the first component 12.

Furthermore, in the region of the step 52, in the present case at its end facing the second component 14, the attachment piece 54 is configured with a radial thickened or reinforcing portion 60. Moreover, the attachment piece 54 also has a greater wall thickness than the remaining part 56 of the first component 12, which prevents the end 17 of the first component 12 or the attachment piece 54 bending out in the radial direction when the clamping piece 26 is brought into clamping engagement with the wall 32.

The step may also, for example, be formed by machining the tube end, for example widening or flanging, as an edge or rim formed integrally with the first component 12 or by rolling in a bead, or by welding, soldering, adhesively bonding or shrinking a bush onto the first component 12. If the first component 12, or at least the end 16 which is to be connected to the second component 14, is made from a thicker material, it is also possible for the at least one step 52 to be produced by material-removing machining.

In the text which follows, the function of the connecting element 16 during connection of the first component 12 to the second component 14 is described.

The preassembled connecting element 16 is inserted into the first component 12.

Then, the screw 36 is turned by means of a suitable tool, for example a hexagon key. Since the nut 48 is secured against rotation, when the screw 36 is turned the nut 48 moves along the shank 40 toward the second component 14, and in doing so, via the slide 30, first of all slides the spacer piece 22 toward the second component 14. In the process, the slide 30 likewise displaces the clamping piece 26 in the direction toward the second component 14, but without any relative movement between the clamping piece 26 and the slide 30. At the beginning of the actuation of the actuating mechanism 34, therefore, first of all the spacer piece 22 is moved until it comes into contact with the second component 14, without the clamping piece 26 coming into clamping engagement with the wall 32 of the first component 12.

This is based on the movement resistance against the movement of the spacer piece 22 being lower than the resistance to a relative displacement of the clamping piece 26 with respect to the conical portion of the slide 30.

As the screw 36 continues to be turned, the bearing surface 24 of the spacer piece 22 comes into contact with the second component 14. The screw head 38 for its part, if this has not already occurred, comes to bear against the second component 14 on the opposite side from the bearing surface 24.

As the screw 36 continues to be turned, the nut 48 slides the slide 30 further toward the second component 14. Since the spacer piece 22, i.e. the sleeves 23 and 25, are now already bearing against the second component 14 in such a manner that they cannot move in the axial direction, the slide 30 then executes an axial movement relative to the spacer piece 22. Since, moreover, the clamping piece 26 is now unable to move in the axial direction, since it is bearing against the spacer piece 22, the further movement of the slide 30, directed axially toward the second component 14, causes the clamping piece 26 to spread or widen, so that it comes into clamping engagement with the wall 32 of the first component 12, more specifically of the attachment piece 54 between the first step 52 and the second step 58. The first component 12 is then securely and rigidly connected to the second component 14.

In this exemplary embodiment, the clamping piece 26 is accordingly formed in such a way that it can be brought into engagement with the wall 32 of the first component 12 by means of the actuating mechanism 34 exclusively as a result of a movement directed transversely with respect to the longitudinal direction 18 of the first component 12.

Figure 3:
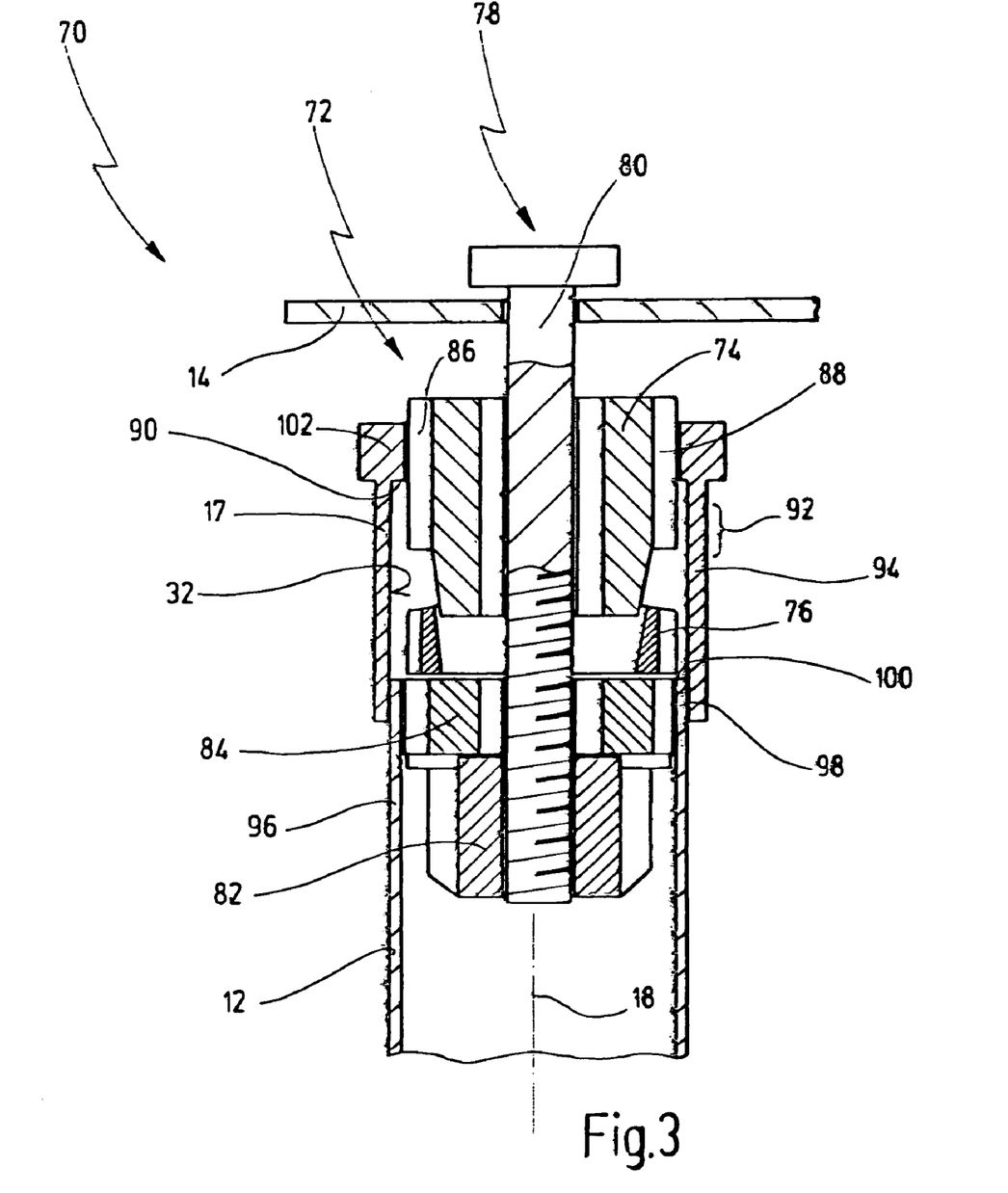
FIG. 3 shows an arrangement in longitudinal section in accordance with a further exemplary embodiment.

FIG. 3 illustrates a further exemplary embodiment of an arrangement having a connecting element 72.

The connecting element 72 has a spacer piece 74, a clamping piece 76 and an actuating mechanism 78, the actuating mechanism 78, as in the exemplary embodiment described above, being operatively connected to the spacer piece 74 and the clamping piece 76, in such a manner that, preferably at the start of actuation of the actuating mechanism 78, the spacer piece 74 is moved in the axial direction until it comes into contact with the second component 14, and that preferably in the event of further actuation the clamping piece 76 comes into clamping engagement with the wall 32 of the first component 12.

For this purpose, the actuating mechanism 78 has a screw 80 and a nut 82, which is in threaded engagement with the screw 80.

Furthermore, a slide 84 in the form of a ring is also arranged between the nut 82 and the clamping piece 76.

Furthermore, in a manner which is not illustrated, the connecting element 72 has a basket which surrounds the arrangement comprising the spacer piece 74, the clamping piece 76, the slide 84 and the nut 82, and specifically not over its entire circumference, but rather only by means of a few, for example two, webs which are delimited in the circumferential direction and along which the nut 82, the slide 84, the clamping piece 76 and the spacer piece 74 are secured against rotation. At their outer circumference, the spacer piece 74, the clamping piece 76, the slide 84 and the nut 82 are provided with corresponding grooves, which can be seen in FIG. 3 and, for example for the spacer piece 74, are denoted by the reference numerals 244 and 246.

At the end 17 which is to be connected to the second component 14, the first component 12 has a step 90 which is directed toward the longitudinal center axis 18 of the first component 12 and in front of which the clamping piece 76 comes into engagement with the wall 32 of the first component 12 when the actuating mechanism 78 is actuated or the screw 80 is turned. When the screw 80 is being tightened, the clamping piece 76 comes into clamping engagement approximately at a location of the wall 32 of the first component 12 which is denoted by the reference numeral 92.

In the exemplary embodiment shown, that end 17 of the first component 12 which is to be connected to the second component 14 is formed by an attachment piece 94 which is connected to the remainder of the first component 12 and on which the step 90 is formed.

The attachment piece 94 is designed in the form of a sleeve which is fixedly connected to the remaining part 96 of the first component 12. For this purpose, the attachment piece 94 partially engages over the outer side of the part 96 of the first component 12 at a location 98 at which the two parts are, for example, welded to one another. In this way, a second step 100, directed toward the longitudinal center axis 18 of the first component 12, is formed at the location 98. The clamping piece 76 comes into clamping engagement with the wall 32 of the attachment piece 94 in the region between the first step 90 and the second step 100, preferably at a location 92 which is closer to the first step 90 than to the second step 100.

The step 90 is present over the entire circumference of the tubular attachment piece 94 and its extent in the radial direction toward the longitudinal center axis 18 approximately corresponds to the wall thickness of the part 96 of the first component 12.

Furthermore, in the region of the step 90, in the present case at its end 102 facing the second component 14, the attachment piece 84 is configured with a thickened portion. Moreover, the attachment piece 94 also has a greater wall thickness than the remaining part 96 of the first component 12.

Furthermore, a flange may also be provided on the attachment piece 94, preferably at the height of the first step 90, so as to additionally prevent the attachment piece 252 from bending open in the radial direction in the region of the step 248.

The arrangement 70 functions as follows.

After the connecting element 72 without the screw 80 has been inserted into the first component 12, the screw 80 is screwed to the nut 82. In the process, the nut 82 moves axially toward the second component 14, and in the process first of all slides the slide 84, the clamping piece 76 and the spacer piece 74 toward the second component 14, until the spacer piece 74 comes to bear against the latter.

Since the spacer piece 74 can then move no further in the axial direction when the screw 80 is turned further, the nut 82, via the slide 84, slides the clamping piece 76 onto the conical portion of the spacer piece 74, with the result that the clamping piece 76 is spread or widened until it comes into clamping engagement with the wall 32 of the first component 12, more specifically of the attachment piece 94.

Accordingly, in this exemplary embodiment the connecting element 72 is formed in such a way that the clamping piece 76 can be brought into engagement with the wall 32 of the first component 12 by means of the actuating mechanism 78 as a result of a superimposed axial movement and a movement directed transversely with respect to the longitudinal direction 18 of the first component 12. The superimposing of an axial movement and a radial movement for the clamping piece 76 allows the latter to dig into the material of the wall 32 of the first component 12, resulting in an engagement between the clamping piece 76 and the wall 32 of the first component 12 which is not just frictionally locking but also partially positively locking.

What is claimed is:

1. An arrangement, comprising:
    a first component, having a longitudinal center axis, a wall and having an end, said first component being in profiled section form at least at said end,
    a second component,
    a connecting element for connecting said end of said first component to said second component at a distance from one another,
    said connecting element having an axially movable spacer for bridging said distance between said end of said first component and said second component, further having at least one clamping piece, which can be brought into contact in a clamping manner with said wall of said first component, and furthermore having an actuating mechanism which is operatively connected to said spacer piece and said clamping piece in such a manner that when said actuating mechanism is actuated, said spacer piece moves in direction of said longitudinal center axis until it comes into contact with said second component and said clamping piece is brought into a clamping engagement with said wall of said first component,
    wherein at said end of said first component there is a first step which is directed toward said longitudinal center axis of said first component and in front of which said at least one clamping piece comes into engagement with said wall of said first component, and
    a further step which is directed towards said longitudinal center axis of said first component and which is at an axial distance from said first step and on an opposite side of said at least one clamping piece from said first step.

2. The arrangement of claim 1, wherein said end of said first component is tubular in form, and wherein said at least one step extends over said entire circumference of said wall of said first component.

3. The arrangement of claim 1, wherein said at least one step is formed on an attachment piece which is fixedly connected to said first component and partially engages over an outside of said first component.

4. The arrangement of claim 1, wherein said spacer piece and said clamping piece are formed as separate elements.

5. The arrangement of claim 1, wherein said connecting element is designed in such a way that said clamping piece can be brought into engagement with said wall of said first component by means of said actuating mechanism as a result of a superimposed axial movement and a movement directed transversely with respect to said longitudinal direction of said first component.

6. The arrangement of claim 1, wherein said connecting element is designed in such a way that said clamping piece can be brought into engagement with said wall of said first component by means of said actuating mechanism as a result of a movement directed transversely with respect to said longitudinal center axis of said first component.

7. The arrangement of claim 1, wherein said actuating mechanism has a screw mechanism, a continuing actuation of which firstly brings said spacer piece into contact with said second component and then brings said clamping piece into engagement with said wall of said first component.

8. The arrangement of claim 7, wherein said screw mechanism has a screw, with which a nut is in threaded engagement, which nut moves towards said second component when said screw is turned, in the process moving said spacer piece in direction of said longitudinal center axis.

9. The arrangement of claim 8, wherein said nut, when said screw is turning, acts on said clamping piece in order to bring it into engagement with said wall of said first component.

10. The arrangement of claim 1, wherein said first component is a tensioning tube, and said second component is at least one of the A-pillars of a vehicle body.

11. An arrangement, comprising:
   a first component, having a longitudinal center axis, a wall and having an end, that first component being in profiled section form at least at said end,
   a second component,
   a connecting element for connecting said end of said first component to said second component at a distance from one another,
   said connecting element having an axially movable spacer for bridging said distance between said end of said first component and said second component, further having at least one clamping piece, which can be brought into contact in a clamping manner with said wall of said first component, and furthermore having an actuating mechanism which is operatively connected to said spacer piece and said clamping piece in such a manner that when said actuating mechanism is actuated, said spacer piece moves in direction of said longitudinal center axis until it comes into contact with said second component and said clamping piece is brought into a clamping engagement with said wall of said first component,
   wherein at said end of said first component there is a first step which is directed towards said longitudinal center axis of said first component, and a second step, which is directed towards said longitudinal center axis of said first component, which is at an axial distance from said first step, wherein said at least one clamping piece comes into engagement with said wall of said first component between said first step and said second step.

12. The arrangement of claim 11, wherein said end of said first component is tubular in form, and wherein said at least one step extends over said entire circumference of said wall of said first component.

13. The arrangement of claim 11, wherein said at least one step is formed on an attachment piece which is fixedly connected to said first component and partially engages over an outside of said first component.

14. The arrangement of claim 11, wherein said spacer piece and said clamping piece are formed as separate elements.

15. The arrangement of claim 11, wherein said connecting element is designed in such a way that said clamping piece can be brought into engagement with said wall of said first component by means of said actuating mechanism as a result of a superimposed axial movement and a movement directed transversely with respect to said longitudinal direction of said first component.

16. The arrangement of claim 11, wherein said connecting element is designed in such a way that said clamping piece can be brought into engagement with said wall of said first component by means of said actuating mechanism as a result of a movement directed transversely with respect to said longitudinal center axis of said first component.

17. The arrangement of claim 11, wherein said actuating mechanism has a screw mechanism, a continuing actuation of which firstly brings said spacer piece into contact with said second component and then brings said clamping piece into engagement with said wall of said first component.

18. The arrangement of claim 17, wherein said screw mechanism has a screw, with which a nut is in threaded engagement, which nut moves towards said second component when said screw is turned, in the process moving said spacer piece in direction of said longitudinal center axis.

19. The arrangement of claim 18, wherein said nut, when said screw is turning, acts on said clamping piece in order to bring it into engagement with said wall of said first component.

20. The arrangement of claim 11, wherein said first component is a tensioning tube, and said second component is at least one of the A-pillars of a vehicle body.

* * * * *